United States Patent [19]
Steiner et al.

[11] 3,797,883
[45] Mar. 19, 1974

[54] SPRING AND TILTING ARRANGEMENT FOR TILTABLE DRIVER CABS

[75] Inventors: Adolf Steiner, Fritz-Von-Graevenitz; Hans Rinnergschwentner, both of Rotenfels, Germany

[73] Assignee: Daimler-Benz Aktiengesellschaft, Stuttgart-Unterturkheim, Germany

[22] Filed: Dec. 15, 1971

[21] Appl. No.: 208,379

Related U.S. Application Data
[62] Division of Ser. No. 9,178, Feb. 6, 1970, Pat. No. 3,649,066.

[30] Foreign Application Priority Data
Feb. 8, 1969 Germany............................ 1906337

[52] U.S. Cl............. 296/35 R, 92/DIG. 4, 180/89 A
[51] Int. Cl......................... B62d 27/04, B62d 27/06
[58] Field of Search............... 180/89 A; 280/43.18; 296/28 C, 35 R; 92/129, DIG. 4

[56] References Cited
UNITED STATES PATENTS
| | | | |
|---|---|---|---|
| 2,563,919 | 8/1951 | Christensen | 280/43.18 |
| 2,210,519 | 8/1940 | Wollensak | 180/89 |
| 2,947,376 | 8/1960 | Norrie | 180/89 |
| 3,393,005 | 7/1968 | Herrmann et al. | 180/89 X |

FOREIGN PATENTS OR APPLICATIONS
978,964   1/1965   Great Britain ........................ 180/89

Primary Examiner—Kenneth H. Betts
Assistant Examiner—Leslie J. Paperner
Attorney, Agent, or Firm—Craig and Antonelli

[57] ABSTRACT

A spring and tilting system for tiltable driver cabs in which springs preferably extending in the vehicle longitudinal direction are provided between the front edge of the driver cab and the vehicle frame while a mounting support of the driver cab equalizing any twisting of the vehicle frame is provided at or near the rear edge of the driver cab. The springs may be constructed as hairpin-shaped, flat springs whose upper leg portion is connected with the driver cab. A lost motion connection is provided between the tilting piston-cylinder mechanism and the driver cab and vehicle frame for permitting free spring action during the normal drive of the vehicle.

14 Claims, 3 Drawing Figures

PATENTED MAR 19 1974

3,797,883

SHEET 1 OF 2

SPRING AND TILTING ARRANGEMENT FOR TILTABLE DRIVER CABS

This application is a divisional application of my copending application, Ser. No. 9,178, filed Feb. 6, 1970, now U.S. Pat. No. 3,649,066 dated Mar. 14, 1972.

The present invention relates to a spring and tilting system for tiltable driver cabs, especially those with comfort equipment.

Driver cabs are generally so connected with the vehicle frame that they include a relatively rigid support in proximity to the steering and a soft spring support in proximity to the rear edge of the driver cab, which entails the disadvantage that the spring effect cannot become effective fully because the driver, for the most part, is seated closer to the forward than to the rear support or mount.

It is the aim of the present invention to eliminate the indicated disadvantage and to create a driver-cab spring means that contributes significantly to the increase of the driving comfort.

As a solution to the underlying problems, a spring and tilting system for tiltable driver cabs, especially for driver cabs with comfort equipment is proposed, in which according to the present invention, starting approximately from the forward edge of the driver cab, springs extending preferably in the vehicle longitudinal direction are arranged between the driver-cab and the vehicle frame, whereby a support or mounting of the driver-cab is provided at the rear edge of the driver-cab equalizing a warping or twisting of the vehicle frame.

In one preferred embodiment of the present invention, the two springs are constructed as approximately hairpin-shaped flat springs with two leg portions connected with each other by way of an arc opposite the driving direction, whose upper leg portions are each connected securely with the driver-cab.

According to a further feature of the present invention, the lower leg portion of each flat spring is rolled together into an eye and is held by a bolt connected securely with the vehicle frame by way of a bracket or plate, which bolt serves simultaneously as lower pivotal connecting place of a shock absorber, whose upper end is elastically suspended at the driver-cab.

With a tiltable driver-cab in which the point of action of the element causing the tilting movement is disposed between the axis of rotation and the center of gravity of the driver cab, a deformation of the flat spring is precluded during the tilting if the upper leg portion of the flat spring projects beyond its fastening place at the driver cab and is bent over at its end into a half-circle open in the upward direction which in the relieved condition of the flat spring abuts against the eye carried by the bolt.

A good lateral guidance of the driver-cab is achieved if the width of the flat spring amounts to a multiple of its thickness.

For the purpose of tilting of the driver-cab at least one cylinder adapted to be actuated by an auxiliary force is provided which, on the one hand, is supported at the vehicle frame and, on the other, is received and held at the driver-cab by means of an elongated aperture. As a result of this arrangement of the cylinder, in case of a nontilted driver-cab an impairment of its spring movement is prevented.

Accordingly, it is an object of the present invention to provide a spring and tilting support for tiltable driver-cabs or compartments which avoids by simple means the aforementioned shortcomings and drawbacks encountered in the prior art.

Another object of the present invention resides in a spring and tilting system for tiltable driver-cabs of motor vehicles which permits the spring effect to become fully effective while at the same time considerably increasing the comfort of the driver.

A further object of the present invention resides in a spring system for the driver-cab of a motor vehicle in which a deformation of the springs is far-reachingly precluded while, at the same time, the lateral guidance of the driver-cab is considerably improved.

These and further objects, features and advantages of the present invention will become more obvious from the following description when taken in connection with the accompanying drawing which shows, for purposes of illustration only, two embodiments in accordance with the present invention, and wherein:

FIG. 1 is a somewhat schematic, greatly simplified cross-sectional view through a driver-cab with a spring system in accordance with the present invention in which only the lower leg portion is rolled-in;

Figure 1:
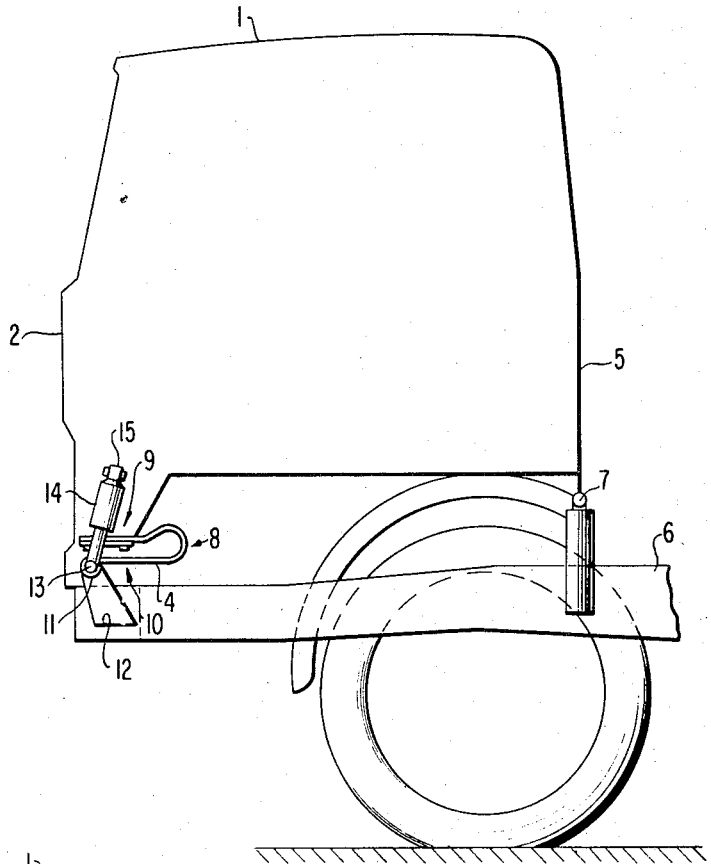

Referring now to the drawings wherein like reference numerals are used throughout the various views, and more particularly to FIG. 1, the driver-cab 1 indicated schematically in this figure is spring-supported in proximity to its forward edge 2 by two springs extending in the vehicle longitudinal direction which are constructed as flat springs 4 of approximately hairpin-shaped configuration. A conventional support 7 of any known construction equalizing any twisting or warping of the vehicle frame 6 is provided at the rear edge 5. Since such supports or mounts 7 are known in the art, a detailed description and showing thereof is dispensed with herein. The two flat springs 4 consist each of an arcuate portion generally designated by reference numeral 8 disposed opposite the driving direction which is adjoined by two leg portions generally designated by reference numerals 9 and 10. The upper leg portion 9 is fixedly connected with the driver-cab 1 whereas the end of the lower leg portion is rolled together into an eye 11 and is carried by a bolt 13 connected fixedly with the vehicle frame 6 by way of a plate-shaped bracket 12. The bolt 13 serves as lower pivotal connecting place for a shock absorber 14 whose upper end 15 is elastically connected with the driver cab 1.

As a result of the arrangement of the flat springs 4 in proximity to the vehicle seats, the spring effect becomes fully operable for the passengers whereby the shock absorbers 14 effect a stroke limitation of the flat springs 4. During curve drives, a high degree of lateral guidance of the driver-cab 1 is achieved in that the width of the flat springs 4 amounts to a multiple of their thickness. The described arrangement may also be utilized in a simple manner for tiltable driver-cabs whereby the connecting line of the two bolts 13 represents the pivot axis. As a result of the appropriate pivotal connection of the shock absorber 14 the latter does not carry out any stroke movement during the tilting operation.

Figure 2:
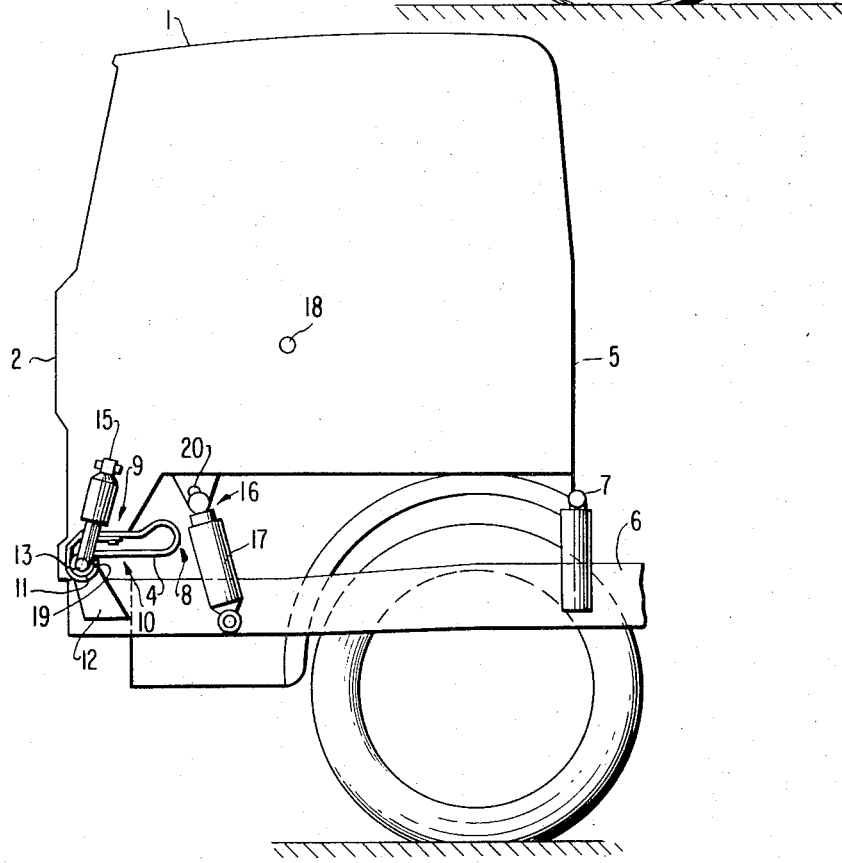
FIG. 2 is a schematic, greatly simplified cross-sectional view through a driver-cab corresponding to FIG. 1, in which, however, the upper leg portion of the spring is bent into a semicircle open in the upward direction.
Figure 3:
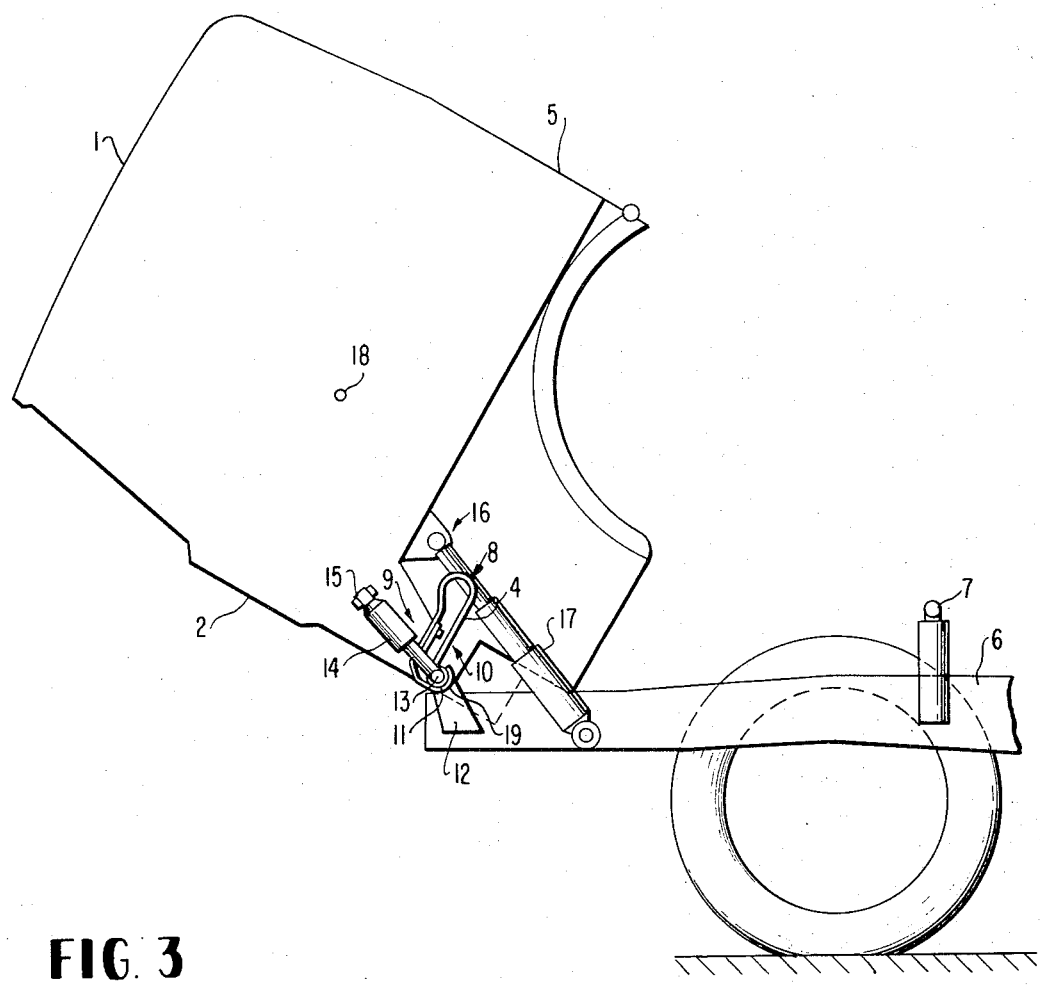
FIG. 3 is a schematic, cross-sectional view of the arrangement according to FIG. 2 in the tilted condition thereof.

If, with a tiltable driver cab, as illustrated in FIGS. 2 and 3, the point of engagement 16 of the cylinder 17 causing the tilting movement is located between the pivot axis formed by the two bolts 13 and the center of gravity 18, then the upper leg portion 9 which extends beyond its fastening place at the driver-cab 1 is bent into a semicircle 19 open in the upward direction. The semicircle 19 abuts in the relieved condition of the flat springs 4 against a respective eye 11 carried by the corresponding bolt 13. If a downward spring deflection of the flat springs 4 takes place, then the leg portion 9 bent into the semicircle 19 lifts off without impairing the spring effect. Furthermore, the cylinder 17 is guided at its pivotal connecting place with the driver-cab 1 in an elongated aperture 20 in order also not to cause any impairment of the spring effect from this side. During the tilting operation which occurs after the abutment of the upper pivotal connecting place of the cylinder 17 against the upper rounded-off portion of the elongated aperture 20, both the eye 11 as also the semicircle 19 of the leg portion 9 abutting thereagainst pivot about the bolt 13 and thus prevent an enlargement and therewith a permanent deformation of the leaf spring 4 connected therewith.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An arrangement for mounting a tiltable driver-cab on a vehicle frame comprising: cushioning means arranged between the driver-cab and the vehicle frame for cushioning forces transmitted therebetween by permitting slight relative movements of the driver-cab and the vehicle frame against the cushioning means, tilting means for selectively tilting the driver-cab into and out of a normal driving position with respect to the vehicle frame, said tilting means being movable from a first inoperative condition for normal driving to a second operative condition for forcefully engaging portions of said driver-cab and said vehicle frame to separate said respective portions, first connection means for connecting said tilting means to said driver-cab, and second connection means for connecting said tilting means to said vehicle frame, at least one of said first and second connection means including lost motion means for permitting the slight relative movements of the driver-cab and the vehicle frame against the cushioning means during the normal driving operation by effectively isolating the tilting means from any forceful contact with the driver-cab and vehicle frame, wherein said driver-cab is pivotally attached to said vehicle frame, and wherein said cushioning means includes shock absorber means, said shock abosrber means being pivotally connected to the vehicle frame adjacent the pivotal connection of the driver-cab to the vehicle frame whereby the shock absorber means remains nonextended during the tilting operation.

2. An arrangement according to claim 1, characterized in that said cushioning means includes spring means operatively engaging said driver-cab and said vehicle frame at positions spaced from said first and second connection means.

3. An arrangement according to claim 1, wherein said pivotal connection of the driver-cab to the vehicle frame is at the front end of the driver-cab, and wherein said first and second connection means are spaced rearwardly of said front end.

4. An arrangement according to claim 1, wherein said lost motion means comprises a pin and slot connection.

5. An arrangement according to claim 1, wherein said cushioning means includes flat spring means.

6. An arrangement according to claim 1, characterized in that said cushioning means is arranged near the forward end of the driver-cab, and in that said first and second connection means are spaced rearwardly from said cushioning means.

7. An arrangement according to claim 1, characterized in that said tilting means includes at least one piston-cylinder means arranged between said first and second connections, and in that said lost motion means includes a straight slot extending in the direction of the longitudinal axis of the piston-cylinder means when the tilting means is in the first inoperative condition.

8. An arrangement according to claim 7, characterized in that said straight slot is provided in a part fixed to the driver-cab which forms part of the first connection means, and in that a pin fixed to one end of said piston-cylinder means extends through said slot.

9. An arrangement according to claim 1, characterized in that said cushioning means is arranged near the forward end of the driver-cab, and in that said first and second connection means are spaced rearwardly from said cushioning means.

10. An arrangement according to claim 9, characterized in that said cushioning means includes spring means adjacent the forward end of the driver-cab.

11. An arrangement according to claim 9, characterized in that said driver-cab is pivotally attached to the forward end of said vehicle frame, and in that said first and second connection means are spaced rearwardly of said forward end.

12. An arrangement according to claim 9, characterized in that mounting means are provided between the driver-cab and the vehicle frame for equalizing twisting motion of the vehicle frame, said mounting means being spaced rearwardly of said first and second connection means.

13. An arrangement according to claim 12, characterized in that said tilting means includes at least one piston-cylinder means arranged between said first and second connections, and in that said lost motion means includes a straight slot extending in the direction of the longitudinal axis of the piston-cylinder means when the tilting means is in the first inoperative condition.

14. An arrangement according to claim 13, characterized in that said straight slot is provided in a part fixed to the driver-cab which forms part of the first connection means, and in that a pin fixed to one end of said piston-cylinder means extends through said slot.

* * * * *